(12) United States Patent
Namba et al.

(10) Patent No.: US 9,206,329 B2
(45) Date of Patent: Dec. 8, 2015

(54) PRE-TREATMENT LIQUID AND IMAGE FORMING METHOD

(71) Applicants: Michihiko Namba, Kanagawa (JP); Shohsuke Aoai, Kanagawa (JP); Tsutomu Maekawa, Kanagawa (JP); Shinya Seno, Kanagawa (JP)

(72) Inventors: Michihiko Namba, Kanagawa (JP); Shohsuke Aoai, Kanagawa (JP); Tsutomu Maekawa, Kanagawa (JP); Shinya Seno, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 24 days.

(21) Appl. No.: 14/090,267

(22) Filed: Nov. 26, 2013

(65) Prior Publication Data
US 2014/0253631 A1 Sep. 11, 2014

(30) Foreign Application Priority Data

Mar. 5, 2013 (JP) ................. 2013-042742

(51) Int. Cl.
*B41J 2/01* (2006.01)
*C09D 11/54* (2014.01)
*B41J 2/21* (2006.01)
*B41M 5/00* (2006.01)

(52) U.S. Cl.
CPC . *C09D 11/54* (2013.01); *B41J 2/01* (2013.01); *B41J 2/2107* (2013.01); *B41M 5/0017* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ................ 347/100, 95, 96, 101, 102, 88, 99; 106/31.13, 31.6, 31.27; 523/160, 161
See application file for complete search history.

(56) References Cited

U.S. PATENT DOCUMENTS

| | | | | |
|---|---|---|---|---|
| 5,696,182 | A | * 12/1997 | Kashiwazaki et al. | ........ 523/161 |
| 6,001,137 | A | * 12/1999 | Alfekri et al. | .................. 8/445 |
| 6,106,602 | A | 8/2000 | Ouchi et al. | |
| 7,033,013 | B2 | * 4/2006 | Koyano et al. | ................ 347/100 |
| 2005/0054751 | A1 | 3/2005 | Namba et al. | |
| 2005/0231575 | A1 | 10/2005 | Bannai et al. | |
| 2007/0221078 | A1 | 9/2007 | Namba et al. | |
| 2008/0070008 | A1 | 3/2008 | Namba et al. | |
| 2008/0145564 | A1 | * 6/2008 | Allam et al. | .................. 427/514 |
| 2008/0248260 | A1 | 10/2008 | Kojima et al. | |
| 2009/0162569 | A1 | 6/2009 | Morohoshi et al. | |
| 2009/0186162 | A1 | 7/2009 | Namba et al. | |

(Continued)

FOREIGN PATENT DOCUMENTS

| | | |
|---|---|---|
| JP | 2003-127536 | 5/2003 |
| JP | 2010-069634 | 4/2010 |

(Continued)

OTHER PUBLICATIONS

U.S. Appl. No. 13/894,635, filed May 15, 2013.

*Primary Examiner* — Manish S Shah
(74) *Attorney, Agent, or Firm* — Cooper & Dunham LLP (57) ABSTRACT

A pre-treatment liquid includes a flocculant formed of a water-soluble cationic polymer obtained by copolymerizing an amine monomer and an epihalohydrin monomer; a surface conditioner; a surfactant; a water-soluble organic solvent; and water.

8 Claims, 1 Drawing Sheet

(56) References Cited

U.S. PATENT DOCUMENTS

| | | |
|---|---|---|
| 2009/0239044 A1 | 9/2009 | Habashi et al. |
| 2009/0258196 A1 | 10/2009 | Nagashima et al. |
| 2009/0258203 A1* | 10/2009 | Aoyama et al. ............. 347/96 |
| 2009/0263632 A1 | 10/2009 | Kojima et al. |
| 2010/0227067 A1 | 9/2010 | Namba et al. |
| 2010/0245416 A1 | 9/2010 | Ohshima et al. |
| 2010/0271435 A1 | 10/2010 | Kojima et al. |
| 2010/0279035 A1 | 11/2010 | Namba et al. |
| 2010/0302326 A1 | 12/2010 | Morohoshi et al. |
| 2011/0092610 A1 | 4/2011 | Habashi et al. |
| 2011/0216123 A1 | 9/2011 | Tamai et al. |
| 2011/0234679 A1* | 9/2011 | Saito ............................ 347/20 |
| 2011/0298876 A1 | 12/2011 | Takeuchi et al. |
| 2011/0300353 A1 | 12/2011 | Habashi et al. |
| 2011/0310166 A1 | 12/2011 | Namba et al. |
| 2012/0086762 A1 | 4/2012 | Noguchi et al. |
| 2012/0147103 A1 | 6/2012 | Hasegawa et al. |
| 2012/0176456 A1 | 7/2012 | Maekawa et al. |
| 2012/0200648 A1 | 8/2012 | Hiraoka et al. |
| 2012/0236066 A1 | 9/2012 | Tamai et al. |
| 2012/0242768 A1 | 9/2012 | Seno et al. |
| 2012/0320133 A1 | 12/2012 | Namba et al. |
| 2013/0065024 A1 | 3/2013 | Aruga et al. |
| 2013/0101814 A1 | 4/2013 | Gotou et al. |
| 2013/0113860 A1 | 5/2013 | Gotou et al. |
| 2013/0194345 A1 | 8/2013 | Tamai et al. |
| 2013/0201252 A1 | 8/2013 | Namba |

FOREIGN PATENT DOCUMENTS

| | | |
|---|---|---|
| JP | 2010-105187 | 5/2010 |
| JP | 2011-173411 | 9/2011 |
| JP | 2012-011567 | 1/2012 |

* cited by examiner

PRE-TREATMENT LIQUID AND IMAGE FORMING METHOD

CROSS-REFERENCE TO RELATED APPLICATIONS

This patent application is based on and claims priority pursuant to 35 U.S.C. §119 to Japanese Patent Application No. 2013-042742, filed on Mar. 5, 2013, in the Japan Patent Office, the entire disclosure of which is hereby incorporated by reference herein.

BACKGROUND

1. Technical Field

The present invention relates to a pre-treatment liquid and an image forming method using the pre-treatment liquid.

2. Description of the Related Art

Image forming methods using aqueous inkjet use a recording medium having a coating layer such as offset printing papers to form glossy images thereon. However, the aqueous ink is difficult to penetrate the recording medium while easy to penetrate a recording medium without a coating layer, and therefore droplets become one on the surface of the recording medium, resulting in an ink having a different color or bleeding between the recording medium and the ink. The bleeding causes a large problem of glossiness of the surface of an image after formed particularly in one pass images in an inkjet high-speed ream book field such as industrial fields. Adaptability between the aqueous ink and the recording medium on a recording medium having a coating layer such as coated papers is not sufficiently ensured. Therefore, matching between the aqueous ink and the recording medium is ensured with exclusive papers. However, this limits the recording media.

As another method, a method of applying a pre-treatment liquid capable of agglutinating or fixing a pigment in the ink on a recording medium having a coating layer just before discharging an ink is disclosed to prevent images from bleeding.

Japanese published unexamined application No. JP-2010-105187-A discloses a recording method of transferring a resin liquid including a particulate thermoplastic resin and an ink composition on a recording medium to print thereon. Japanese published unexamined application No. JP-2011-173411-A discloses an inkjet recording method of transferring a reaction liquid including an organic ammonium salt and a water-soluble cation polymer and an ink composition including a colorant and a resin emulsion on a recording medium to print thereon.

Japanese published unexamined application No. JP-2010-69634-A discloses using a treatment liquid including epihalohydrin and an amine copolymer as a cohesion promoter of an ink component.

The conventional recording methods using a pre-treatment liquid consume a large amount of the pre-treatment liquid to ensure image quality in applications such as high-speed ream book machines. In this case, between application of the pre-treatment liquid and discharge of the ink, the pre-treatment liquid contacts a transfer member and transfers thereto, resulting in problems such as damages thereof, retransfer due to accumulation of contamination and image quality deterioration such as back transfer. Further, a coated paper may deteriorate in strength of its coating layer due to the pre-treatment liquid.

In order to solve this problem, the pre-treatment liquid is dried after applied. This solves the transfer of the pre-treatment liquid, but causes other problems such as deterioration of cohesion ability of the pre-treatment liquid. Further, the present inventors found printed images deteriorate in glossiness after pretreated.

Because of these reasons, a need exists for a pre-treatment liquid capable of preventing deterioration of granularity and glossiness of images formed on a recording medium having a coating layer with an aqueous ink after the pre-treatment liquid is applied thereon and dried.

SUMMARY

Accordingly, one object of the present invention is to provide a pre-treatment liquid capable of preventing deterioration of granularity and glossiness of images formed on a recording medium having a coating layer with an aqueous ink after the pre-treatment liquid is applied thereon and dried.

Another object of the present invention is to provide an image forming method using the pre-treatment liquid.

These objects and other objects of the present invention, either individually or collectively, have been satisfied by the discovery of a pre-treatment liquid including a flocculant formed of a water-soluble cationic polymer obtained by copolymerizing an amine monomer and an epihalohydrin monomer; a surface conditioner; a surfactant; a water-soluble organic solvent; and water.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
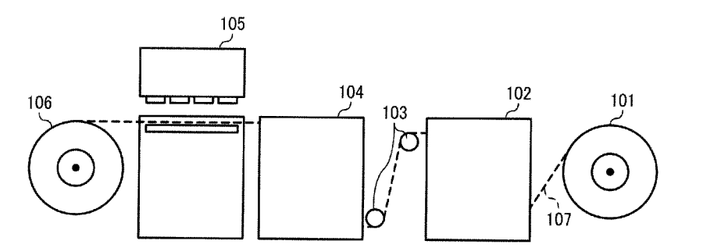
FIGURE is a schematic view for explaining a whole structure of an inkjet recorder.

The present invention provides a pre-treatment liquid capable of preventing deterioration of granularity and glossiness of images formed on a recording medium having a coating layer with an aqueous ink after the pre-treatment liquid is applied thereon and dried.

The pre-treatment liquid of the present invention essentially includes the specific flocculant formed of a water-soluble cationic polymer, a surface conditioner, a surfactant, a water-soluble organic solvent and water.

The pre-treatment liquid preferably includes these materials in an amount of from 10 to 70% by weight, more preferably from 30 to 60% by weight, and furthermore preferably from 40 to 60% by weight. When less than 10% by weight, prevention of cohesion ability deterioration after the drying process may be less. When greater than 70% by weight, it may be difficult to add a material imparting penetration and wettability needed in coating a recording medium.

The pre-treatment liquid of the present invention prevents deterioration of cohesion ability and image glossiness in the drying process with a suitable combination of the water-soluble cationic polymer, the surface conditioner and the surfactant in a heating process to dry after application of the pre-treatment liquid.

It is assumed that the surface conditioner included in the pre-treatment liquid of the present invention improves leveling ability of agglomerated pigments on a recording medium in penetration process of ink thereto to hold smoothness of images and prevent deterioration of image glossiness when images are formed with an aqueous ink after pre-treatment.

The flocculant in the pre-treatment liquid agglomerates a pigment in an ink. A water-soluble cationic polymer obtained by copolymerizing an amine monomer and an epihalohydrin monomer is used as the flocculant.

The water-soluble cationic polymer including a hydroxyl group and an ammonium cation in its main chain, and releasing a halogen anion in an aqueous solution is thought to increase shock absorption in contact with an aqueous ink and agglomeration of the pigment.

Specific examples of the water-soluble cationic polymer include polyamine-epihalohydrin copolymers, polyamide-epihalohydrin copolymers, polyamidepolyamine-epihalohydrin copolymers and amine-epihalohydrin copolymers.

Particularly, a copolymer having the following formula (1):

(1)

wherein each of R1 to R8 represents an alkyl group having 1 to 8 carbon atoms, a hydroxy alkyl group, an alkenyl group or a benzyl group; X represents a halogen atom; and n is an integer of 1 or 2;

a copolymer having a repeat unit having the following formula (2):

(2)

wherein X represents a halogen atom; m is an integer not less than 1; and both ends of the copolymer may be a monomer forming a repeat unit or a known initiator; or a copolymer formed of an amine monomer, and monomers having the following formulae (4) and (5):

(4)

(5)

wherein X represents a halogen atom such as F, Cl, Br and I; is preferably used.

The amine monomer includes diethylenetriamine, triethylenetetramine, tetraethylenepentamine, iminobispropylamine, etc. having the following formula (3):

(3)

Diethylenetriamine is preferably used because of being industrially produced and easily obtainable.

Besides these compounds, a quaternary ammonium salt cationic polymer may be used as the water-soluble cationic polymer.

The water-soluble cationic polymer typically includes a polymer having a dimethylamine-epichlorohydrin quaternary salt skeleton having the following formula:

wherein each of $R^1$ and $R^2$ represents an alkyl group having 1 to 8 carbon atoms; and n is an integer representing the number of repeat units.

The water-soluble cationic polymer preferably has a weight-average molecular weight of from 500 to 100,000 when the copolymer is a polyamine-epihalohydrin copolymer, not greater than 5,000,000 when the copolymer is a polyamide-epihalohydrin copolymer or a polyamide-polyamine-epihalohydrin copolymer, and 700 to 50,000 when the copolymer is an amine-epihalohydrin copolymer. When greater than each of the upper limits, the water-soluble cationic polymer may not be an aqueous solution. When less than each of the lower limits, the pre-treatment liquid may deteriorate in its effect.

The pre-treatment liquid preferably includes the water-soluble cationic polymer in an amount not less than 10% by weight, and more preferably from 20 to 60% by weight. When less than 10% by weight, prevention of cohesion ability deterioration after the drying process may be less. When greater than 6-% by weight, the effect may not change even when the content is increased and other materials may be difficult to add.

The surface conditioner smoothes the surface of an image when the pre-treatment liquid and the pigment in the ink agglomerate. Even when the pre-treatment liquid contacts the ink and the pigment agglomerates, the surface conditioner keeps the surface of an agglomerated image smooth without deteriorating cohesion ability.

The surface conditioner preferably has a polyether-modified polydimethylsiloxane structure and includes involatile components in an amount not less than 95% by weight. The pre-treatment liquid preferably includes the surface conditioner in an amount of from 0.01 to 0.50% by weight, and more preferably from 0.05 to 0.3% by weight. When less than 0.01% by weight, there is no effect against deterioration of image glossiness. When greater than 0.50% by weight, the surface conditioner may separate in the pre-treatment liquid and preservation reliability thereof may be impaired.

Marketed products of the polyether-modified polydimethylsiloxane include BYK302, 307, 331 and 333 from BYK Chemie Japan KK; and KF-353 from Shin-Etsu Chemical Co., Ltd., etc. Particularly, BYK331 and 333 are preferably used. KF-353 has the following polyether-modified polydimethylsiloxane structure:

wherein each of l, m, n, p and q is an integer representing the number of repeat units.

The surfactant is added to modify wettability of a recording medium and improve density, color saturation and white spots (blanks) of images.

The pre-treatment liquid preferably includes the surfactant in an amount of from 0.10 to 0.50% by weight. When less than 0.10% by weight, its effect may be less. When greater than 0.50% by weight, the effect may not change even when the content is increased and preservation reliability may be impaired.

Fluorochemical surfactants, silicone surfactants, nonionic surfactants, anionic surfactants and betaine surfactants are preferably used as the surfactant. Particularly, the nonionic surfactants are more preferably used because of improving granularity and preventing deterioration of glossiness of images. Among the nonionic surfactants, acetylene glycol surfactants are preferably used.

Specific examples of the nonionic surfactant include polyoxyethylenealkylether, polyoxyethylenealkyl allyl ether, polyoxyethylenealkylphenylether, polyoxyethylene glycol ester, polyoxyethylene fatty acid amide, polyoxyethylene fatty acid ester, polyoxyethylene polyoxypropylene glycol, glycerin ester, sorbitan ester, saccharose ester, polyoxyethylene ether of glycerin ester, polyoxyethylene ether of sorbitan ester, polyoxyethylene ether of sorbitol ester, fatty acid alkanolamide, amineoxide, polyoxyethylenealkylamine, glycerin fatty acid ester, sorbitan fatty acid ester, polyoxyethylene sorbitol fatty acid ester, alkyl(poly)glycoxyde, etc.

Marketed products of the acetylene glycol surfactants include Surfynol 104, 104E, 104H, 104A, 104BC, 104DPM, 104PA, 104PG-50, 104S, 420, 440, 465, 485, SE, SE-F, 504, 61, 82, DF37, DF110D, CT111, CT121, CT131, CT136, TG and GA from Air Products and Chemicals, Inc.; Acetynol E00, E00P, E40 and E100 from Kawaken Fine Chemicals Co., Ltd.; and Olfine B, Y, P, A, STGSPC, E1004, E1010, PD-001, PD-002W, PD-003, PD-004, AF-103, AF-104, AK-02, SK-14 and AE-3 from Nissin Chemical Industry Co., Ltd. Particularly, Surfynol 104S is preferably used.

The water-soluble organic solvent is added as a wetter. Specific examples thereof include polyols, polyol alkyl ethers, polyol aryl ethers, nitrogen-containing heterocyclic compounds, amides, amine, sulfur-containing compounds, propylene carbonates and ethylene carbonates. Particularly, in terms of keeping discharging and coating stability, the water-soluble organic solvent having an equilibrium moisture content not less than 30%, and more preferably not less than 40% by weight in an environment of a temperature of 23° C. and a humidity of 80% is preferably used.

Among these, the polyols are preferably used. Specific examples thereof include 1,2,3-butanetriol (bp: 175° C./33 hPa, 38% by weight), 1,2,4-butanetriol (bp: 190° C. to 191° C./24 hPa, 41% by weight), glycerin (bp: 290° C., 49% by weight), diglycerin (bp: 270° C./20 hPa, 38% by weight), triethylene glycol (bp: 285° C., 39% by weight), tetraethylene glycol (bp: 324° C. to 330° C., 37% by weight), diethylene glycol (bp: 245° C., 43% by weight), 1,3-butanediol (bp: 203° C. to 204° C., 35% by weight).

Specific examples of the water-soluble organic solvent or the wetter having not too high a equilibrium moisture preferably used in terms of cohesion ability of the pre-treatment liquid include water-soluble organic solvents or wetters having an equilibrium moisture content not less than 30% by weight at 23° C. and 80% RH such as polyols, polyol alkyl ethers, polyol aryl ethers, nitrogen-containing heterocyclic compounds, amides, amine, sulfur-containing compounds, propylene carbonates and ethylene carbonates.

Specific examples of the polyols include dipropylene glycol (bp: 232° C.), 1,5-pentanediol (bp: 242° C.), 3-methyl-1,3-butanediol (bp: 203° C.), propylene glycol (bp: 187° C.), 2-methyl-2,4-pentanediol (bp: 197° C.), ethylene glycol (bp: 196° C. to 198° C.), dipropylene glycol (bp: 267° C.), hexylene glycol (bp: 197° C.), polyethylene glycol (viscous liquid to solid), polypropylene glycol (bp: 187° C.), 1,6-hexanediol (bp: 253° C. to 260° C.), 1,2,6-hexanetriol (bp: 178° C.), trimethylolethane (solid; mp: 199° C. to 201° C.), and trimethylolpropane (solid; mp: 61° C.).

Specific examples of the polyol alkyl ethers include ethylene glycol monoethyl ether (bp: 135° C.), ethylene glycol monobutyl ether (bp: 171° C.), diethylene glycol monomethyl ether (bp: 194° C.), diethylene glycol monoethyl ether (bp: 197° C.), diethylene glycol monobutyl ether (bp: 231° C.), ethylene glycol mono-2-ethylhexyl ether (bp: 229° C.), and propylene glycol monoethyl ether (bp: 132° C.).

Specific examples of the polyol aryl ethers include ethylene glycol monophenyl ether (bp: 237° C.), and ethylene glycol monobenzyl ether.

Specific examples of the nitrogen-containing heterocyclic compounds include 2-pyrrolidone (bp: 250° C., mp: 25.5° C.), N-methyl-2-pyrrolidone (bp: 202° C.), 1,3-dimethyl-2-imidazolidinone (bp: 226° C.), ε-caprolactam (bp: 270° C.), and γ-butyrolactone (bp: 204° C. to 205° C.).

Specific examples of the amides include formamide (bp: 210° C.), N-methylformamide (bp: 199° C. to 201° C.), N,N-dimethylformamide (bp: 153° C.), and N,N-diethylformamide (bp: 176° C. to 177° C.).

Specific examples of the amines include monoethanolamine (bp: 170° C.), diethanolamine (bp: 268° C.), triethanolamine (bp: 360° C.), N,N-dimethylmonoethanolamine (bp: 139° C.), N-methyldiethanolamine (bp: 243° C.), N-methylethanolamine (bp: 159° C.), N-phenylethanolamine (bp: 282° C. to 287° C.), and 3-aminopropyldiethylamine (bp: 169° C.).

Specific examples of the sulfur-containing compounds include dimethylsulfoxide (bp: 139° C.), sulfolane (bp: 285° C.), and thiodiglycol (bp: 282° C.).

In addition to the above water-soluble organic solvents, other welters such as urea compounds and sugars may be used. Specific examples of the sugars include monosaccharides, disaccharides, oligosaccharides (including trisaccharide, tetrasaccharides), and polysaccharides. Specific examples thereof include glucose, mannose, fructose, ribose, xylose, arabinose, galactose, maltose, cellobiose, lactose, sucrose, trehalose, and maltotriose. Here, the term "polysaccharides" refers to sugars in a broad sense of the term, and it is used to mean substances present extensively in the nature, including α-cyclodextrin, cellulose. Also, examples of derivatives of these sugars include reducing sugars of the sugars {e.g. sugar alcohols [General Formula: $HOCH_2(CHOH)_nCH_2OH$ (where n represents an integer of 2 to 5)], and oxidized sugar (e.g. aldonic acid, uronic acid)}, amino acids, and thio acids. Among these, sugar alcohols are preferable, and specific examples thereof include maltitol and sorbit.

Among the water-soluble organic solvents, the polyols are preferably used in consideration of keeping discharging and coating stability and cohesion effect of the pre-treatment liquid. Glycerin and 1,3-butanediol are preferably used, and particularly 3-methyl-1,3-butanediol is more preferably used.

The pre-treatment liquid includes the water-soluble organic solvent, not particularly limited, in an amount of from 5 to 80% by weight, and preferably from 10 to 0% by weight. When greater than 80% by weight, a recording medium on which a pre-treatment liquid is applied may lower in drying performance depending on the water-soluble organic solvent. In addition, the content of the flocculant in the pre-treatment liquid is so low that the pre-treatment liquid may largely deteriorate in cohesion ability. When less than 5% by weight, water included in the pre-treatment liquid is easily vaporized and the viscosity thereof increases, resulting in possible problems in coating process.

The pre-treatment liquid may include a penetrant, a defoamer, a pH adjuster, an antiseptic and antifungal agent, an antirust agent, etc.

The penetrants include non-wetting polyols or glycol ethers having 8 to 11 carbon atoms. It more preferably has a solubility of 0.2% by weight to 5.0% by weight in water at 25° C., and 2-ethyl-1,3-hexanediol [solubility: 4.2%(25° C.)], 2,2,4-trimethyl-1,3-pentanediol [solubility: 2.0%(25° C.)] are particularly preferable.

The other non-wetting polyols include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol, etc.

The penetrant other than the above that can be used in combination is not particularly limited as long as it dissolved in the pre-treatment liquid for adjusting to desired physical properties, and it may be appropriately selected according to purpose. Examples thereof include: alkyl and aryl ethers of a polyhydric alcohol such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohols such as ethanol.

A content of the penetrant in the pre-treatment liquid is preferably 0.1 to 5.0% by weight. When the content is less than 0.1% by weight, the penetrant may not have an effect for the pre-treatment liquid to penetrate. When the content exceeds 5.0% by weight, the penetrant separates from the solvent due to its low solubility to the solvent, which may result in an effect of improving penetration being saturated.

The pre-treatment liquid may include a defoamer preventing the liquid from encircling air.

Typically, a liquid having high surface tension such as water is difficult to foam because a force to reduce a surface area of the liquid as small as possible works. A liquid having low surface tension is easily foamed and is kept long and difficult to defoam. The pre-treatment liquid of the present invention including the flocculant, the surface conditioner, the water-soluble organic solvent, the surfactant, etc, decreases in surface tension and increases in viscosity. Therefore, it is easily foamed and a defoamer is preferably used.

The pre-treatment liquid preferably includes the defoamer in an amount of from 0.01 to 10% by weight, and more preferably from 0.02 to 5% by weight. When less than 0.01% by weight, foams may not sufficiently prevented. When greater than 10% by weight, the effect may not change even when the content is increased and the defoamer may not be dissolved in the pre-treatment liquid.

The pH adjuster is not particularly limited as long as it may adjust a pH of the aqueous ink being prepared to 4 to 8 without adversely affecting the ink. It may be appropriately selected according to necessity. When less than 4, transfer rollers contacting the pre-treatment liquid erode and transferability may be impaired.

Specific examples of the pH adjuster include alcohol amines, hydroxides of an alkali metal element, hydroxides of ammonium, hydroxides of phosphonium, and carbonates of an alkali metal.

Specific examples the alcohol amines include diethanolamine, triethanolamine, and 2-amino-2-ethyl-1,3-propanediol. Specific examples the hydroxides of an alkali metal element include lithium hydroxide, sodium hydroxide and potassium hydroxide. Specific examples of the hydroxides of ammonium include ammonium hydroxide and quaternary ammonium hydroxide. Specific examples of the hydroxides of phosphonium include quaternary phosphonium hydroxide. Specific examples of the carbonates of an alkali metal include lithium carbonate, sodium carbonate and potassium carbonate.

Specific examples the antiseptic and antifungal agent include sodium dehydroacetate, sodium sorbate, 2-pyridinethiol 1-oxide sodium, sodium benzoate, sodium pentachlorophenol, 1,2-benzoisothiazoline-3-onsodium compounds, etc.

Specific examples the antirust agent include acid sulfite, sodium thiosulfate, ammonium thiodiglycolate, diisopropyl ammonium nitrite, pentaerythritol tetranitrate, dicyclohexylammonium nitrite, 1,2,3-benzotriazole, etc.

Hereinafter, the aqueous ink used together with the pre-treatment liquid is explained, but is not limited thereto.

The aqueous ink includes a water-dispersible colorant, a water-soluble organic solvent, a surfactant, a penetrant and water, and other components when necessary.

The water-dispersible colorant is not particularly limited and may be appropriately selected according to purpose. A pigment is preferable in view of weather resistance, but a dye may be used in combination for color adjustment within a range that it does not degrade weather resistance.

The pigment is not particularly limited and may be appropriately selected according to purpose. Specific examples thereof include black or color inorganic pigments and organic pigments. These may be used alone or in combination.

Specific examples of the inorganic pigments include titanium oxide, iron oxide, calcium carbonate, barium sulfate, aluminum hydroxide, barium yellow, cadmium red, chrome yellow, and carbon black manufactured by a heretofore known method such as contact method, furnace method and thermal method.

Specific examples of the organic pigments include azo pigments (including azo lake, insoluble azo pigments, condensed azo pigments, chelate azo pigments, etc.), polycyclic pigments (e.g. phthalocyanine pigments, perylene pigments, perinone pigments, anthraquinone pigments, quinacridone pigments, dioxazine pigments, indigo pigments, thioindigo pigments, isoindolinone pigments, quinophthalone pigments, etc.), dye-type chelate (e.g. basic dye-type chelate, acid dye-type chelate, etc.), nitro pigments, nitroso pigments, and aniline black. Among these pigments, those having high affinity with water are preferable. Specific examples of the preferable black pigments include: carbon blacks such as furnace black, lampblack, acetylene black, and channel black (C. I. Pigment Black 7); metals such as copper and iron (C. I.

Pigment Black 11); metal oxides such as titanium oxide; organic pigments such as aniline black (C. I. Pigment Black 1).

Also, specific examples of the preferable color pigments include: C. I. Pigment Yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 138, 150, 151, 153, 183; C. I. Pigment Orange 5, 13, 16, 17, 36, 43, 51; C, I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 185, 190, 193, 209, 219; C. I. Pigment Violet 1 (Rhodamine Lake), 3, 5:1, 16, 19, 23, 38; C. I. Pigment Blue 1, 2, 15, 15:1, 15:2, 15:3 (Phthalocyanine Blue), 16, 17:1, 56, 60, 63; and C.I. Pigment Green 1, 4, 7, 8, 10, 17, 18, 36.

When the water-dispersible colorant is a pigment-based colorant, preferable embodiments thereof include the following first and second embodiments. In particular, a water-dispersible colorant of the first embodiment is preferably used.

The first embodiment includes a polymer emulsion in which a water-insoluble or poorly water-soluble pigment is included in polymeric particles (aqueous dispersion of polymeric particles including a pigment).

The second embodiment includes a pigment which includes at least one type of a hydrophilic group on a surface thereof and exhibits water-dispersibility in the absence of a dispersant (which may also be referred to as a "self-dispersible pigment" hereinafter). Here, in the second embodiment, it is preferable to include a water-dispersible resin described hereinafter.

As the water-dispersible colorant of the first embodiment, it is preferable to use, in addition to the pigment, a polymer emulsion in which a pigment is included in polymeric particles. The polymer emulsion in which a pigment is included in polymeric particles is that a pigment is encapsulated in polymeric particles or that a pigment is adsorbed on a surface of polymeric particles. In this case, it is not necessary that all the pigment is encapsulated or adsorbed, and a part of the pigment may be dispersed in the emulsion. Specific examples of a polymer which forms the polymer emulsion include a vinyl polymer, a polyester polymer and a polyurethane polymer, and those preferable are the vinyl polymer and the polyester polymer. For example, polymers disclosed in JP-A No. 2000-53897 and JP-A No. 2001-139849 can be used.

As the water-dispersible colorant of the second embodiment, those subjected to surface modification such that at least one type of a hydrophilic group is bound to a surface of the pigment directly or via other atomic groups. As the surface modification, a method that a specific functional group (functional groups such as sulfonic group and carboxyl group) is chemically bound to a surface of the pigment or a wet oxidation treatment is carried out using at least any one of hypohalous acid and a salt thereof is used. Among these, an embodiment that the pigment having a carboxyl group bound to a surface thereof is dispersed in water is particularly preferable. Since the pigment is surface-modified in this way to have a carboxyl group bound thereto, dispersion stability improves, and in addition, high print quality may be obtained as well as water resistance of the recording medium after printing further improves.

Also, an aqueous ink including this self-dispersible pigment of the second embodiment has superior redispersibility after drying, and thus favorable printing may be carried out easily by a simple cleaning operation without occurrence of clogging even though ink moisture near an inkjet head nozzle has evaporated after a long period of pause of printing.

A volume average particle diameter ($D_{50}$) of the self-dispersible pigment in the ink is preferably 0.01 µm to 0.16 µm.

The self-dispersible pigment is preferably ionic, and a pigment anionically charged by an anionic hydrophilic group, etc. is more preferable.

The anionic hydrophilic group is not particularly limited and may be appropriately selected according to purpose. Specific examples thereof include —COOM, —SO$_3$M, —PO$_3$HM, —PO$_3$M$_2$, —SO$_2$NH$_2$, —SO$_2$NHCOR (where M represents an alkali metal, an ammonium or an organic ammonium; and R represents an alkyl group having 1 to 12 carbon atoms, a phenyl group which may have a substituent or a naphthyl group which may have a substituent). Among these, color pigments having —COOM, —SO$_3$M bound to a surface thereof are preferable.

Also, the alkali metal "M" in the hydrophilic group is not particularly limited and may be appropriately selected according to purpose. Specific examples thereof include lithium, sodium, and potassium. The organic ammonium "M" in the hydrophilic group is not particularly limited and may be appropriately selected according to purpose. Specific examples thereof include mono- to trimethylammonium, mono- to trimethyl ammonium and mono- to trimethanolammonium.

A method for obtaining the anionically charged color pigment is not particularly limited and may be appropriately selected according to purpose. Specific examples thereof include a method of introducing —COONa to a surface of the color pigment. Specific examples of the method for introducing —COONa to a surface of the color pigment include: a method of oxidizing the color pigment with sodium hypochlorite; a method of sulfonation; and a method of reacting with a diazonium salt.

The anionic hydrophilic group may be bound to a surface of carbon black via other atomic groups. The other atomic groups are not particularly limited and may be appropriately selected according to purpose. Specific examples thereof include an alkyl group having 1 to 12 carbon atoms, a phenyl group which may have a substituent and a naphthyl group which may have a substituent.

Specific examples of the case where the anionic hydrophilic group is bound to a surface of carbon black via other atomic groups include: —C$_2$H$_4$COOM (where M represents an alkali metal or a quaternary ammonium) and -PhSO$_3$M (where Ph represents a phenyl group; M represents an alkali metal or a quaternary ammonium).

A content of the colorant in the aqueous ink is, as a solid content, preferably 2 to 15% by weight, and more preferably 3 to 12% by weight. The content of less than 2% by weight or exceeding 15% by weight is not preferable since the ink with the former may have decreased color developing property and image density and with the latter have poor discharge property due to increased viscosity.

The water-soluble organic solvent same as those for the pre-treatment liquid are favorably used. A weight ratio of the water-dispersible colorant to the water-soluble organic solvent affects ink discharge stability from a head. For example, when a solid content of the water-dispersible colorant is large despite a small amount of the water-soluble organic solvent, evaporation of water near an ink meniscus in the nozzle may proceed, resulting in poor discharge.

A content of the water-soluble organic solvent in the aqueous ink is preferably 20 to 50% by weight, and more preferably 20 to 45% by weight. When the content is less than 20% by weight, discharge stability may decrease, or waste ink may fix in a supporting device of an inkjet recording apparatus. Also, when the content exceeds 50% by weight, drying properties on paper may be inferior, and further letter quality on plain paper may decrease.

Specific examples of the preferable water-soluble organic solvent include glycerin, trimethylolpropane, ethylene glycol, diethylene glycol, triethylene glycol, propylene glycol, dipropylene glycol, tripropylene glycol, 1,2-butanediol, 1,3-butanediol, 2,3-butanediol, 1,4-butanediol, 3-methyl-1,3-butanediol, 1,2-pentanediol, 1,5-pentanediol, 1,2-hexanediol, 1,6-hexanediol, 2-methyl-2,4-hexanediol, 1,2-octanediol, 2-pyrrolidone, N-methyl-2-pyrrolidone, N-hydroxyethyl-2-pyrrolidone, tetramethyl urea, and urea.

The surfactants having dispersion stability not sacrificed, a low surface tension, and high penetration property and leveling property regardless of the types of the water-dispersible colorant and a combination with the water-soluble organic solvent are preferable. For example, an anionic surfactant, a non-ionic a surfactant, silicone surfactant and a fluorosurfactant are preferable. Among these, the silicone surfactant and the fluorosurfactant are particularly preferable. These surfactants may be used alone or in combination.

A content of the surfactant in the aqueous ink is preferably 0.01 to 3.0% by weight, and more preferably 0.5 to 2% by weight. When the content is less than 0.01% by weight, an effect of adding a surfactant may not be obtained. When it exceeds 3.0% by weight, penetration into a recording medium increases more than necessary, and decrease of image density and strikethrough may occur, especially with plain paper.

The penetrants same as those for the pre-treatment liquid are preferably used.

A content of the penetrating agent in the aqueous ink is preferably 0.1 to 4.0% by weight. When the content is less than 0.1% by weight, quick drying property may not be obtained, resulting in a blurred image. When it exceeds 4.0% by weight, dispersion stability of the colorant is impaired, and decrease of image density and strikethrough, e.g. easily clogged nozzle and excessive increase in penetration to a recording medium, may occur.

The other components are not particularly limited and may be appropriately selected according to necessity. Specific examples thereof include a pH adjuster, an antiseptic and antifungal agent, an antirust agent, a chelate reagent, an antioxidant, an UV absorber, an oxygen absorber, a light stabilizer, etc.

The pH adjuster is not particularly limited as long as it may adjust a pH of the aqueous ink being prepared to 7 to 11 without adversely affecting the ink. It may be appropriately selected according to necessity. When the pH of the aqueous ink is less than 7 or exceeds 11, a dissolved amount of an inkjet head an ink supply unit increases, which may cause defects such as alteration or leakage of the ink and discharge failure.

Specific examples of the pH adjuster include the same as those for the pre-treatment agent.

Specific examples of the antiseptic and antifungal agent, and the antirust agent include the same as those for the pre-treatment agent as well.

Specific examples of the chelate reagent include sodium ethylenediaminetetraacetate, sodium nitrilotriacetate, sodium hydroxyethylethylenediamine triacetate, sodium diethylenetriamine pentaacetate, sodium uramildiacetate, etc.

Specific examples of the antioxidant include a phenol-based antioxidant (including a hindered phenol-based antioxidant), an amine-based antioxidant, a sulfur-based antioxidant, a phosphorus-based antioxidant, etc Specific examples of the UV absorber include a benzophenone-based UV absorber, a benzotriazole UV absorber, a salicylate-based UV absorber, a cyanoacrylate-based UV absorber, a nickel complex salt-based UV absorber etc.

The aqueous ink is manufactured by dispersing or dissolving the water-dispersible colorant, the water-soluble organic solvent, the surfactant, the penetrant and the water, and the other components when necessary, in an aqueous medium, and further by stirring and mixing according to necessity. A method for the stirring and mixing is not particularly restricted and may be appropriately selected according to necessity, using a sand mill, a homogenizer, a ball mill, a paint shaker, an ultrasonic disperser, a stirrer using ordinary stirring blades, a magnetic stirrer, and a high-speed disperser, for example.

Physical properties of the aqueous ink are not particularly limited and may be appropriately selected according to purpose.

A viscosity of the aqueous ink at 25° C. is preferably 5 mPa·s to 20 mPa·s. An effect of improved print density and letter quality may be obtained with the viscosity being 5 mPa·s or greater. At the same time, discharge property may be ensured with the viscosity suppressed to 20 mPa·s or less. Here, the viscosity may be measured at 25° C., for example, using a viscometer (RE-550L, manufactured by Toki Sangyo Co., Ltd.).

Also, static surface tension of the aqueous ink at 25° C. is preferably 20 mN/m to 35 mN/m, and more preferably 20 mN/m to 30 mN/m. When the static surface tension is within the range of 20 mN/m to 35 mN/m, the ink has increased penetration, which is effective in reducing bleeding and resulting in favorable drying properties in printing on plain paper, and the ink is more easily placed on a pre-treatment layer, resulting in improved color development and white spots. However, when the static surface tension exceeds 35 mN/m, leveling of the ink on a recording medium is less likely to occur, and drying time may be longer.

A color of the aqueous ink is not particularly limited and may be appropriately selected according to purpose, and examples thereof include yellow, magenta, cyan, and black. A multi-color image may be formed by recording using an ink set as a combination of two or more colors, and a full-color image may be formed by recording using an ink set as a combination of all the colors.

The aqueous ink can be used in any printers such as a piezoelectric element type in which ink droplets are discharged by transforming a vibration plate forming the wall of the ink flowing route using a piezoelectric element as a pressure generating device to press the ink in the ink flowing route as described in JP-H2-51734-A; a thermal type in which bubbles are produced by heating ink in the ink flowing route with a heat element as described in JP-S61-59911-A; and an electrostatic type in which ink droplets are discharged by transforming a vibration plate by a force of electrostatic generated between the vibration plate and the electrode while the vibration plate and the electrode are provided facing each other as described in JP-H6-71882-A.

The aqueous ink can be used in printers heating a recording medium and an ink when and after images are printed at 50 to 200° C. to accelerate fixing the images as well.

The pre-treatment liquid of the present invention is effectively used when forming an image on a recording medium having a coating layer on at least one surface of its substrate such as offset printing papers. However, plain paper having sizing degree of 10 s or greater and air permeability of 5 to 50 s, which does not include a coating layer and is generally used as copy paper may be used.

The offset printing paper is coated paper that is used in commercial printing such as so-called art paper (A0, A1), A2 coated paper, A3 coated paper, B2 coated paper, light-weight coated paper, and slightly coated paper, denoting paper used for offset printing and gravure printing.

Specific examples of the marketed art paper include: OK Kanefuji N, OK Kanefuji-R40N, SA Kanefuji N, Satin Kanefuji N, Satin Kanefuji-R40N, Ultrasatin Kanefuji N, Ultra OK Kanefuji N, Kanefuji One Side (all manufactured by Oji Paper Co., Ltd.); NPi Special Art, NPi Super Art, NPi Super Dull, NPi Dull Art (all manufactured by Nippon Paper Industries Co., Ltd.); Utrillo Super Art, Utrillo Super Dull, Utrillo Premium (all manufactured by Daio Paper Corporation); High-Quality Art, Tokuhishi Art, Super Mat Art A, High-Quality Dull Art A (all manufactured by Mitsubishi Paper Mills Ltd.); Raicho Super Art N, Raicho Super Art MN, Raicho Special Art, Raicho Dull Art N (all manufactured by Chuetsu Pulp & Paper Co., Ltd.), etc.

Specific examples of the marketed A2 coated paper include: OK Top Coat+(plus), OK Top Coat S, OK Casablanca, OK Casablanca V, OK Trinity, OK Trinity NaVi, New Age, New Age W, OK Top Coat Mat N, OK Royal Coat, OK Top Coat Dull, Z Coat, OK Kasahime, OK Kasao, OK Kasao Satin, OK Top Coat+, OK Non-wrinkle, OK Coat V, OK Coat N Green 100, OK Mat Coat Green 100, New Age Green 100, Z Coat Green 100 (all manufactured by Oji Paper Co., Ltd.); Aurora Coat, Shiraoi Mat, Imperial Mat, Silver Diamond, Recycle Coat 100, Cycle Mat 100 (all manufactured by Nippon Paper Industries Co., Ltd.); Mu Coat, Mu White, Mu Mat, White Mu Mat (all manufactured by Hokuetsu Paper Mills Ltd.); Raicho Coat N, Regina Raicho Coat 100, Raicho Mat Coat N, Regina Raicho Mat 100 (all manufactured by Chuetsu Pulp & Paper Co., Ltd.); Pearl Coat, White Pearl Coat N, New V Mat, White New V Mat, Pearl Coat REW, White Pearl Coat NREW, New V Mat REW, White New V Mat REW (all manufactured by Mitsubishi Paper Mills Ltd.), etc.

Specific examples of the marketed A3 coated (light-weight coated) paper include: OK Coat L, Royal Coat L, OK Coat LR, OK White L, OK Royal Coat LR, OK Coat L Green 100, OK Mat Coat L Green 100 (all manufactured by Oji Paper Co., Ltd.); Easter DX, Recycle Coat L100, Aurora L, Recycle Mat L100, <SSS> Energy White (all manufactured by Nippon Paper Industries Co., Ltd.); Utrillo Coat L, Matisse Coat (all manufactured by Daio Paper Corporation); Hi Alpha, Alpha Mat, (N) Kinmari L, Kinmari HiL (all manufactured by Hokuetsu Paper Mills Ltd.); N Pearl Coat L, N Pearl Coat LREW, Swing Mat REW (all manufactured by Mitsubishi Paper Mills Ltd.); Super Emine, Emine, Chaton (all manufactured by Chuetsu Pulp & Paper Co., Ltd.), etc.

Specific examples of the marketed B2 coated (medium-quality coated) include OK Medium Quality Coat, (F) MCOP, OK Astro Gloss, OK Astro Dull, OK Astro Mat (all manufactured by Oji Paper Co., Ltd.); King O (manufactured by Nippon Paper Industries Co., Ltd.), etc.

Specific examples of the slightly coated paper include: OK Royal Light S Green 100, OK Ever Light Coat, OK Ever Light R, OK Ever Green, Clean Hit MG, OK Microcoated Super Eco G, Eco Green Dull, OK Microcoated Mat Eco G100, OK Star Light Coat, OK Soft Royal, OK Bright, Clean Hit G, Yamayuri Bright, Yamayuri Bright G, OK Aqua Light Coat, OK Royal Light S Green 100, OK Bright (rough, gloss), Snow Mat, Snow Mat DX, OK Kasahime, OK Kasayuri (all manufactured by Oji Paper Co., Ltd.); Pyrene DX, Pegasus Hyper 8, Aurora S, Andes DX, Super Andes DX, Space DX, Seine DX, Special Gravure DX, Pegasus, Silver Pegasus, Pegasus Harmony, Greenland DX100, Super Greenland DX100, <SSS> Energy Soft, <SSS> Energy Light, EEHenry (all manufactured by Nippon Paper Industries Co., Ltd.); Kant Excel, Excel Super B, Excel Super C, Kant Excel Bal, Utrillo Excel, Heine Excel, Dante Excel (all manufactured by Daio Paper Corporation); Cosmo Ace (manufactured by Nippon Daishowa Paperboard Co., Ltd.); Semi-Jo L, Hi Beta, Hi Gamma, Shiromari L, Hamming, White Hamming, Semi-Jo HiL, Shiromari HiL (all manufactured by Hokuetsu Paper Mills Ltd.); Ruby Light HREW, Pearl Soft, Ruby Light H (all manufactured by Mitsubishi Paper Mills Ltd.); Chaton, Ariso, Smash (all manufactured by Chuetsu Pulp & Paper Co., Ltd.); Star Cherry, Cherry Super (all manufactured by Marusumi Paper Co., Ltd.), etc.

The image forming method of the present invention include a process of applying a pre-treatment liquid on a coating layer of a recording medium having the coating layer on at least one surface of its substrate, a process of drying the pre-treatment liquid applied thereon, a process of discharging an aqueous ink by an inkjet method to form an image on the dried recording medium.

A method of applying a pre-treatment liquid is not particularly limited as long as it may uniformly be applied on the surface of a recording medium. Specific examples of the coating method include a blade coating method, a gravure coating method, a gravure offset coating method, a bar coating method, a roll coating method, a knife coating method, an air knife coating method, a comma coating method, a U comma coating method, an AKKU coating method, a smoothing coating method, a micro-gravure coating, a reverse roll coating method, a four-roll or five-roll coating method, a dip-coating method, a curtain coating method, a slide coating method, and a die coating method.

An amount of the pre-treatment liquid applied on the recording medium before dried is preferably from 0.1 to 20.0 $g/m^2$, and more preferably from 0.5 to 10.0 $g/m^2$. When less than 0.1 $g/m^2$, image quality (image density, color saturation, color bleed and feathering) hardly improves. When it exceeds 20.0 $g/m^2$, drying properties of the pre-treatment liquid degrades, transferability of the recording medium after printed deteriorates, the resultant image is not sufficiently dried, fixability thereof deteriorates, texture of the recording medium is impaired, and cost problems may occur.

In the process of drying the pre-treatment liquid applied on the recording medium, it may be artificially dried such that it is not transferred to transfer members to cause troubles thereof and image quality deterioration due to accumulation of contamination from the process of applying the pre-treatment liquid to the process of forming an image. The pre-treatment liquid is preferably dried at from 40 to 130° C., and more preferably from 80 to 100° C. When less than 40° C., it takes too much tome to dry. When higher than 130° C., the recording medium may have quality problems such as wrinkles.

Drying methods include a heat drum method, an oven method, a hot air blowing method, a pre-heater method, a heat roller method, etc. These may be used alone or in combination.

The process of forming an image is a process of discharging an ink by an inkjet recording method to form an image on the dried recording medium. The inkjet recording method includes known methods such as a method of using lined heads and a method of scanning heads. A method of driving a recording head to discharge an ink is not particularly limited, either. Specific examples thereof include a method of using a piezoelectric element actuator formed of PZT (lead zirconate titanate), a method of using a heat energy, a method of using an on-demand type head with an actuator using an electrostatic force, a method of recording with a continuous spray charge control head. The method of using a heat energy is difficult to freely control spraying droplets and tend to have uneven image quality according to a recoding medium. The pre-treatment liquid applied to the recording medium solves this problem and provides high-quality images regardless of the recording medium.

An embodiment of a recorder used in the image forming method of the present invention is explained, referring to FIGURE.

The recorder records an image on a ream recording medium using lined heads.

A recording medium 101 is transferred through a conveyance route 107. After a pre-treatment liquid is applied on a coating layer side of the recording medium 101 by a pre-treatment liquid applicator 102 (pre-treatment liquid applying process), the pre-treatment liquid is dried by a drier 104 via a roller 103 (drying process). Then, an aqueous ink is discharged by an inkjet recording method by a printing device 105 on a dried surface of the recording medium 101 to form an image (image forming process) to obtain a printed recording medium 106.

EXAMPLES

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.
<Flocculant Preparation Examples>

Preparation Example 1

In a glass autoclave having a capacity of 1,000 ml, equipped with a stirrer, a thermometer and a nitrogen gas inlet tube, 200 g (2.218 mol) of 50% dimethylamine and 291.0 g (1.477 mol) of 30% trimethylamine were placed and subjected to nitrogen substitution, and then 274.0 g (2.961 mol) of epichlorohydrin were added therein for 2 hrs while the mixture was cooled to have a temperature of 40° C. The mixture was kept for 1 hr at the same temperature, and heated to have a temperature of 80° C. and aged for 3 hrs. After cooled, 77.0 g of 35% hydrochloric acid and 0.82 g of 75% phosphoric acid (to solid content 730 ppm) were added to the mixture to have a pH of 5.0. Thus, 840.0 g of a flocculant formed of a cationic polymer having a quaternization rate of 91% including a solid content of 58% was obtained. The yield rate was 99.7%. The cationic polymer had a viscosity of 21 mPa·s and included 1,3-dichloro-2-propanol (DCH) not greater than 100 ppm.

The dimethylamine and the trimethylamine were placed in aqueous solutions. The amount of placement is a net converted value of each amine. The reactant had a pH of 12 before controlled.

Preparation Example 2

In the same autoclave in Preparation Example 1, 200 g (2.218 mol) of 50% dimethylamine and 218.5 g (1.109 mol) of 30% trimethylamine were placed and subjected to nitrogen substitution, and then 257.0 g (2.777 mol) of epichlorohydrin were added therein for 2 hrs while the mixture was cooled to have a temperature of 40° C. The mixture was kept for 1 hr at the same temperature, and heated to have a temperature of 80° C. and aged for 3 hrs.

After cooled, 54.5 g of 35% hydrochloric acid and 0.92 g of 75% phosphoric acid were added to the mixture to have a pH of 5.0. The mixture was further diluted with pure water to include a solid content having a concentration of 60%. Thus, a flocculant formed of a cationic polymer having a viscosity of 36 mPa·s was obtained.

Preparation Example 3

In the same autoclave in Preparation Example 1, 200 g (2.218 mol) of 50% dimethylamine and 174.8 g (0.887 mol) of 30% trimethylamine were placed and subjected to nitrogen substitution, and then 246.0 g (2.659 mol) of epichlorohydrin were added therein for 2 hrs while the mixture was cooled to have a temperature of 40° C. The mixture was kept for 1 hr at the same temperature, and heated to have a temperature of 80° C. and aged for 3 hrs.

After cooled, 46.2 g of 35% hydrochloric acid and 0.87 g of 75% phosphoric acid were added to the mixture to have a pH of 5.0. The mixture was further diluted with pure water to include a solid content having a concentration of 60%. Thus, a flocculant formed of a cationic polymer having a viscosity of 40 mPa·s was obtained. The reactant had a pH of 10.5 before controlled.

Preparation Example 4

In the same autoclave in Preparation Example 1, 200 g (2.218 mol) of 50% dimethylamine and 145.7 g (0.739 mol) of 30% trimethylamine were placed and subjected to nitrogen substitution, and then 239.0 g (2.583 mol) of epichlorohydrin were added therein for 2 hrs while the mixture was cooled to have a temperature of 40° C. The mixture was kept for 1 hr at the same temperature, and heated to have a temperature of 80° C. and aged for 3 hrs.

After cooled, 38.5 g of 35% hydrochloric acid and 0.82 g of 75% phosphoric acid were added to the mixture to have a pH of 5.0. The mixture was further diluted with pure water to include a solid content having a concentration of 60%. Thus, a flocculant formed of a cationic polymer having a viscosity of 48 mPa·s was obtained.

Preparation Example 5

In the same autoclave in Preparation Example 1, 200 g (2.218 mol) of 50% dimethylamine and 145.7 g (0.739 mol) of 30% trimethylamine were placed and subjected to nitrogen substitution, and then 239.0 g (2.583 mol) of epichlorohydrin were added therein for 2 hrs while the mixture was cooled to have a temperature of 40° C. The mixture was kept for 1 hr at the same temperature, and heated to have a temperature of 80° C. and aged for 3 hrs.

After cooled, 38.5 g of 35% hydrochloric acid and 0.82 g of 75% phosphoric acid were added to the mixture to have a pH of 5.0. The mixture was further diluted with pure water to include a solid content having a concentration of 60%. Thus, a flocculant formed of a cationic polymer having a viscosity of 48 mPa·s was obtained.

Preparation Example 6

In the same autoclave in Preparation Example 1, 200 g (2.218 mol) of 50% dimethylamine and 291.0 g (1.477 mol) of 30% trimethylamine were placed and subjected to nitrogen substitution, and then 274.0 g (2.961 mol) of epichlorohydrin were added therein for 2 hrs while the mixture was cooled to have a temperature of 40° C. The mixture was kept for 1 hr at the same temperature, and heated to have a temperature of 80° C. and aged for 3 hrs.

After cooled, 77.0 g of 35% hydrochloric acid were added to the mixture to have a pH of 5.0. The mixture was further diluted with pure water to include a solid content having a concentration of 60%. Thus, a flocculant formed of a cationic polymer having a viscosity of 20 mPa·s was obtained.

Only 77.0 g of 35% hydrochloric acid without 0.82 g of 75% phosphoric acid made mixture have a pH of 5.0.

Preparation Example 7

As quaternizers, 6.4 g (0.022 mol) of 3-chloro-2-hydroxypropyltimethylammonium chloride and 4.7 g (0.022 mol) of glycidyltrimethylammoniumchloride were added to an aqueous solution of the same cationic polymer having a quaternization rate of 91% including a solid content of 58%, and the mixture was stirred for 2 hrs at 60° C. to obtain a flocculant. The cationic polymer aqueous solution has a pH of 4.8, a quaternization rate of 99% and a viscosity of 23 mPa·s.

Preparation Example 8

In a four-neck flask having a capacity of 500 ml, equipped with a stirrer, a thermometer, a reflux cooling tube and a nitrogen gas inlet tube, 95.1 g of water and 131.8 g (0.8 mol) of 58% trimethylamine hydrochloride aqueous solution were placed. While the mixture was cooled not to have a temperature higher than 40° C. under introduction of nitrogen gas, 74.0 g (0.8 mol) of epichlorohydrin were dropped therein for 3 hrs. Then, the mixture was heated to have a temperature of 80° C. and reacted for 1 hr. Then, the mixture was cooled to have a temperature of 30° C., 36.1 g (0.4 mol) of 50% dimethylamine aqueous solution and 14.8 g (0.2 mol) of 75% potassium hydride were added to the mixture, and the mixture was heated to have a temperature of 80° C. and reacted for 1 hr. Then, the reacted liquid was adjusted with a hydrochloric acid and water to have a pH of 4.0 and include a solid content of 50% to obtain a flocculant.

Preparation Example 9

In a four-neck flask having a capacity of 500 ml, equipped with a stirrer, a thermometer, a reflux cooling tube and a nitrogen gas inlet tube, 36.8 g of water and 157.6 g (0.8 mol) of 30% trimethylamine aqueous solution, 36.1 g (0.4 mol) of dimethylamine aqueous solution and 7.3 g (0.1 mol) of diethylamine were placed. While the mixture was cooled not to have a temperature higher than 40° C. under introduction of nitrogen gas, 92.5 g (1.0 mol) of epichlorohydrin were dropped therein for 4 hrs. Then, the mixture was heated to have a temperature of 80° C. and reacted for 2 hrs. Then, the reacted liquid was cooled to have a temperature of 30° C. and adjusted with a sulfuric acid and water to have a pH of 3.9 and include a solid content of 50% to obtain a flocculant.

Preparation Example 10

In a four-neck round-bottom flask having a capacity of 3 L, equipped with copolymer thermometer, a cooler, a stirrer and a nitrogen gas inlet tube, 495 g (4.8 mol) of diethylenetriamine were placed, and 877 g (6.0 mol) of adipic acid were added therein while stirred and heated while water being produced was removed. After the mixture was reacted at 150° C. for 5 hrs, 1,000 g of water were gradually added therein to prepare a polyamidepolyamine-containing liquid. The polyamidepolyamine-containing liquid included a solid content of 52.1% and a viscosity of 380 mPa·s at 25° C. when including a solid content of 50%.

Next, 100 g (0.214 mol as an amino group) of the polyamidepolyamine-containing liquid, 3.8 g (30 equivalent weight %) of acetic acid, 4.3 g of 30% sodium hydroxide (15 equivalent weight %) and 6.7 g of water were mixed to include a solid content of 50%. Then, after 19.8 g (100 equivalent weight %) of epichlorohydrin were dropped for 1 hr at 30° C. in the mixture, the mixture was held for 1 hr at the same temperature and 0.8 g (2 equivalent weight %) of sodium metabissulfite were added therein, and the mixture was held for 5 hrs at the same temperature since epichlorohydrin started dropping. Then, after 1.1 g (10 equivalent weight %) of 98% sulfuric acid and 127.0 g of water were added to the mixture to include a solid content of 30%, the mixture was heated to have a temperature of 75° C. Then, after the reacted liquid was held at 25° C. until having a viscosity of 300 mPa·s, 40.5 g of water were added thereto to include a solid content of 26%. After the reacted liquid was cooled to have a temperature not higher than 25° C., it was adjusted to have a pH of 3.5 with a 30% sulfuric acid. Further, the reacted liquid was adjusted to have a pH of 3.0 with an 88% formic acid to obtain a flocculant including a solid content of 25.0% and a viscosity of 51.6 mPa·s when including a solid content of 15%.

Preparation Example 11

In a four-neck flask having a capacity of 1 L, equipped with a polyamine-epichlorohydrin copolymer stirrer, a thermometer, a reflux cooling tube and a nitrogen gas inlet tube, 443.85 parts of water and 41.27 parts of diethylenetriamine were placed. While the mixture was kept not to have a temperature higher than 40° C. under introduction of nitrogen gas, 111.04 parts of epichlorohydrin were dropped therein for 1.5 hrs. Then, after 19.4 parts of octahydro-4,7-methanoindene-1(2), 5(6)-dimethaneamine were added therein and stirred for 30 min, 18.51 parts of epichlorohydrin were dropped therein for 0.5 hrs such that the mixture did not have a temperature higher than 40° C., and was heated to have a temperature of 70° C. and kept for 1.5 hrs. Then, 30% sodium hydride were added to the mixture to have a ph of 7.5 and kept for 1.5 hrs again. Further, the mixture was adjusted with a 30% sulfuric acid aqueous solution to have a pH of 3.5 and cooled to complete the reaction. The resultant flocculant included a solid content of 30.2%, a viscosity of 7.6 cps (solid content of 10%) and a pH of 3.5.

Preparation Example 12

In a four-neck flask having a capacity of 1 L, equipped with a stirrer, a thermometer, a reflux cooling tube and a nitrogen gas inlet tube, 657.2 parts of water, 58.4 parts of triethylenetetramine and 108 parts of 50% dimethylamine were placed. While the mixture was kept not to have a temperature higher than 40° C. under introduction of nitrogen gas, 192.4 parts of epichlorohydrin were dropped therein for 1.5 hrs, and the mixture was heated to have a temperature of 70° C. and kept for 1.5 hrs. Then, 30% sodium hydride were added to the mixture to have a ph of 7.5 and further kept for 1.5 hrs at 70° C. Then, the mixture was adjusted with a 30% sulfuric acid aqueous solution to have a pH of 3.5 and cooled to complete the reaction. The resultant flocculant included a solid content of 29.9%, a viscosity of 20 cps (solid content of 10%) and a pH of 3.5.

Examples 1 to 12 and Comparative Examples 1 to 12

<Preparation of Pre-treatment Liquid>

Pre-treatment liquids of Examples 1 to 12 and Comparative Examples 1 to 12 were prepared using combinations of the flocculants prepared in Preparation Examples 11 to 12, surface conditioners, surfactants and water-soluble organic solvents shown in Tables 1-1 and 1-2 as follows.

First, the water-soluble organic solvent, the surface conditioner, the surfactant and ion-exchanged water were stirred for 1 hr to be uniformly mixed, and the flocculant was added to the mixture and stirred for 1 hr to be uniformly mixed therewith. The resultant mixture was subjected to pressure filtration with a polyvinylidenefluoride membrane filter having an average pore diameter of 5.0 μm to remove coarse particles and dusts therefrom. Thus, a pre-treatment liquid was prepared.

The pre-treatment liquid included the water-soluble organic solvent in an amount of 20% by weight and the ion-exchanged water in such an amount that the components were 100% by weight in total.

In Tables 1-1 and 1-2,

*1: The pre-treatment liquid includes the flocculant in an amount of 40% by weight

*2: The pre-treatment liquid includes the flocculant in an amount of 50% by weight

*3: The pre-treatment liquid includes the flocculant in an amount of 60% by weight

*4: The pre-treatment liquid includes the flocculant in an amount of 10% by weight

*5: The surface conditioners BYK331 and BYK333 are from BYK Chemie Japan KK

*6: Surfynol 104S is from Air Products and Chemicals, Inc.

*7: Acetynol E100 is from Kawaken Fine Chemicals Co., Ltd.

*8: PD-001 is from Nissin Chemical Industry Co., Ltd.

TABLE 1-1

| | Flocculant | *5 surface conditioner/content |
|---|---|---|
| Example 1 | *1 Preparation Example 1 | BYK331/0.01% |
| Example 2 | *1 Preparation Example 2 | BYK333/0.05% |
| Example 3 | *1 Preparation Example 3 | BYK331/0.20% |
| Example 4 | *1 Preparation Example 4 | BYK333/0.50% |
| Example 5 | *2 Preparation Example 5 | BYK331/0.01% |
| Example 6 | *2 Preparation Example 6 | BYK333/0.05% |
| Example 7 | *2 Preparation Example 7 | BYK331/0.20% |
| Example 8 | *2 Preparation Example 8 | BYK333/0.50% |
| Example 9 | *3 Preparation Example 9 | BYK331/0.009% |
| Example 10 | *3 Preparation Example 10 | BYK333/0.05% |
| Example 11 | *3 Preparation Example 11 | BYK331/0.20% |
| Example 12 | *3 Preparation Example 12 | BYK333/0.50% |
| Comparative Example 1 | *4 Preparation Example 1 | — |
| Comparative Example 2 | *4 Preparation Example 2 | — |
| Comparative Example 3 | *4 Preparation Example 3 | — |
| Comparative Example 4 | *4 Preparation Example 4 | — |
| Comparative Example 5 | *4 Preparation Example 5 | BYK331/0.005% |
| Comparative Example 6 | *4 Preparation Example 6 | BYK333/0.70% |
| Comparative Example 7 | *4 Preparation Example 7 | BYK331/0.005% |
| Comparative Example 8 | *4 Preparation Example 8 | — |
| Comparative Example 9 | *4 Preparation Example 9 | BYK331/0.005% |
| Comparative Example 10 | *4 Preparation Example 10 | BYK333/0.70% |
| Comparative Example 11 | *4 Preparation Example 11 | BYK331/0.005% |
| Comparative Example 12 | *4 Preparation Example 12 | BYK333/0.20% |

TABLE 1-2

| | Surfactant/content | Water-soluble organic solvent | Balance |
|---|---|---|---|
| Example 1 | *6 Surfynol 104S/0.10% | 1,3-butanediol | Ion-exchanged water |
| Example 2 | *6 Surfynol 104S/0.20% | 1,3-butanediol | Ion-exchanged water |
| Example 3 | *6 Surfynol 104S/0.20% | Diethyleneglycol | Ion-exchanged water |
| Example 4 | *6 Surfynol 104S/0.50% | Diethyleneglycol | Ion-exchanged water |
| Example 5 | *7 Acetynol E100/0.10% | 1,3-butanediol | Ion-exchanged water |
| Example 6 | *7 Acetynol E100/0.20% | 1,3-butanediol | Ion-exchanged water |
| Example 7 | *7 Acetynol E100/0.20% | Diethyleneglycol | Ion-exchanged water |
| Example 8 | *7 Acetynol E100/0.50% | Diethyleneglycol | Ion-exchanged water |
| Example 9 | *8 PD-001/0.10% | 1,3-butanediol | Ion-exchanged water |
| Example 10 | *8 PD-001/0.20% | 1,3-butanediol | Ion-exchanged water |
| Example 11 | *8 PD-001/1.00% | Diethyleneglycol | Ion-exchanged water |
| Example 12 | *8 PD-001/0.50% | Diethyleneglycol | Ion-exchanged water |
| Comparative Example 1 | *6 Surfynol 104S/0.01% | 1,3-butanediol | Ion-exchanged water |
| Comparative Example 2 | *6 Surfynol 104S/0.05% | 1,3-butanediol | Ion-exchanged water |
| Comparative Example 3 | *6 Surfynol 104S/1.00% | Diethyleneglycol | Ion-exchanged water |
| Comparative Example 4 | *6 Surfynol 104S/2.00% | Diethyleneglycol | Ion-exchanged water |
| Comparative Example 5 | — | 1,3-butanediol | Ion-exchanged water |
| Comparative Example 6 | — | 1,3-butanediol | Ion-exchanged water |
| Comparative Example 7 | — | Diethyleneglycol | Ion-exchanged water |
| Comparative Example 8 | *7 Acetynol E100/0.10% | Diethyleneglycol | Ion-exchanged water |
| Comparative Example 9 | — | 1,3-butanediol | Ion-exchanged water |
| Comparative Example 10 | — | 1,3-butanediol | Ion-exchanged water |

TABLE 1-2-continued

|  | Surfactant/content | Water-soluble organic solvent | Balance |
|---|---|---|---|
| Comparative Example 11 | — | Diethyleneglycol | Ion-exchanged water |
| Comparative Example 12 | — | Diethyleneglycol | Ion-exchanged water |

<Preparation of Pigment-containing Polymeric Particle Dispersion>

Dispersion Preparation Example 1

Magenta Pigment-Containing Polymeric Particle Dispersion

—Preparation of Polymer Solution A—

After a 1-liter flask equipped with a mechanical stirrer, a thermometer, a nitrogen gas inlet tube, a reflux tube and a dropping funnel was sufficiently purged with a nitrogen gas, 11.2 g of styrene, 2.8 g of acrylic acid, 12.0 g of lauryl methacrylate, 4.0 g of polyethylene glycol methacrylate, 4.0 g of a styrene macromer, and 0.4 g of mercaptoethanol were mixed and heated to 65° C.

Next, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of a styrene macromer, 3.6 g of mercaptoethanol, 2.4 g of azobismethylvaleronitrile, and 18.0 g of methyl ethyl ketone was added dropwise in the flask over 2.5 hours. After the dropwise addition, a mixed solution of 0.8 g of azobismethylvaleronitrile and 18 g of methyl ethyl ketone was added dropwise in the flask over 0.5 hours. After it was aged at 65° C. for 1 hour, 0.8 g of azobismethylvaleronitrile was added, and it was further aged for 1 hour. After completion of the reaction, 364.0 g of methyl ethyl ketone was added in the flask, and 800 g of Polymer Solution A having a concentration of 50% by weight was obtained.

—Preparation of Magenta Pigment-containing Polymeric Particle Dispersion—

After sufficient stirring of 28 g of Polymer Solution A, 42 g of C. I. Pigment Red 122, 13.6 g of a 1-mol/L aqueous solution of potassium hydroxide, 20.0 g of methyl ethyl ketone, and 13.6 g of ion-exchanged water, the mixture was kneaded using a roll mill.

After an obtained paste was sufficiently stirred with an addition of 200 g of pure water, methyl ethyl ketone and water were distilled using an evaporator, and it was further subjected to a pressure filtration by a polyvinylidene fluoride membrane filter having an average pore diameter of 5.0 μm in order to remove coarse particles. Thereby, a magenta pigment-containing polymeric particle dispersion having a pigment content of 15% by weight and a solid content of 20% by weight was obtained.

An average particle diameter (D50) of the polymeric particles in this dispersion was measured, and it was 82.7 nm. Here, the measurement of an average particle diameter (D50) was carried out using a particle size distribution measuring apparatus (NANOTRAC UPA-EX150, manufactured by Nikkiso Co., Ltd.).

Dispersion Preparation Example 2

Cyan Pigment-containing Polymeric Particle Dispersion

The procedure for preparation of the magenta pigment-containing polymeric particle dispersion in Dispersion Preparation Example 1 was repeated except for replacing the C. I. Pigment Red 122 with a phthalocyanine pigment (C. I. Pigment Blue 15:3) to prepare a cyan pigment-containing polymeric particle dispersion.

An average particle diameter (D50) of the polymeric particles in this dispersion was 110.6 nm. The measurer was the same as that in Dispersion Preparation Example 1.

Dispersion Preparation Example 3

Yellow Pigment-containing Polymeric Particle Dispersion

The procedure for preparation of the magenta pigment-containing polymeric particle dispersion in Dispersion Preparation Example 1 was repeated except for replacing the C. I. Pigment Red 122 with a monoazo yellow pigment (C. I. Pigment Yellow 74) to prepare a yellow pigment-containing polymeric particle dispersion.

An average particle diameter (D50) of the polymeric particles in this dispersion was 105.4 nm. The measurer was the same as that in Dispersion Preparation Example 1.

<Preparation of Ink>

Inks of Ink Preparation Examples 1 to 3 using materials shown in Table 2 were prepared as follows. Preparation Examples 1 to 3 are magenta ink, a cyan ink and yellow ink, respectively. Contents of materials are shown in Table 2. Zonyl FS-300 is a fluorochemical surfactant from Du Pont.

First, a water-soluble organic solvent (wetter), a surfactant and water were mixed and stirred to be uniformly mixed. Then, Pigment Dispersions 1 to 3 and controllers were added to the mixture and stirred for 1 hr. The resultant dispersion was subjected to pressure filtration with a polyvinylidene-fluoride membrane filter having an average pore diameter of 5.0 μm to remove coarse particles and dusts therefrom. Thus, an ink was prepared.

TABLE 2

|  |  | Ink Preparation Example 1 | Ink Preparation Example 2 | Ink Preparation Example 3 |
|---|---|---|---|---|
| Pigment Dispersion | Dispersion Preparation Example 1 | 50 |  |  |
|  | Dispersion Preparation Example 2 |  | 40 |  |
|  | Dispersion Preparation Example 3 |  |  | 40 |
| Water-soluble organic solvent | 1,3-butanediol | 20 | 20 | 20 |
| Surfactant | Zonyl FS-300 | 2 | 2 | 2 |
|  | Pure Water | Balance | Balance | Balance |
| Total (% by weight) |  | 100 | 100 | 100 |

The pre-treatment liquids of Examples and Comparative Examples in Tables 1-1 and 1-2 and the inks of Ink Preparation Examples 1 to 3 were used to evaluate images.

<Evaluation 1: Granularity Evaluation of Images after Dried on a Recording Medium after the Pre-Treatment Liquid was Applied Thereon>

After the pre-treatment liquid was applied on a surface of a recording medium having a coating layer (OK Coat+ from Oji Paper Co., Ltd.) by a roller coating method in an amount of 1.20±0.20 g/m$^2$, a single color cyan ink and second color green ink were discharged at one pass to form a 1200 dpi solid image (3 cm×3 cm) thereon. Then, the image was dried at 90° C. for 30 sec by an oven to evaluate granularity (uneven image density) of the solid image by visual observation, compared with rank samples on the following standard. The results are shown in table 3. The second color green was formed with the cyan ink and the yellow ink.

[Evaluation Standard]
1: Serious uneven image density, blanks (ink is scarcely printed) are noticeable
2: Considerable uneven image density
3: Slight uneven image density
4: No uneven image density

TABLE 3

|  | Granularity | |
| --- | --- | --- |
|  | Cyan | Green |
| Example 1 | 3 | 3 |
| Example 2 | 4 | 4 |
| Example 3 | 4 | 4 |
| Example 4 | 4 | 3 |
| Example 5 | 3 | 3 |
| Example 6 | 4 | 4 |
| Example 7 | 4 | 4 |
| Example 8 | 4 | 3 |
| Example 9 | 3 | 3 |
| Example 10 | 4 | 4 |
| Example 11 | 3 | 3 |
| Example 12 | 4 | 3 |
| Comparative Example 1 | 1 | 1 |
| Comparative Example 2 | 2 | 1 |
| Comparative Example 3 | 1 | 1 |
| Comparative Example 4 | 2 | 1 |
| Comparative Example 5 | 1 | 1 |
| Comparative Example 6 | 2 | 1 |
| Comparative Example 7 | 1 | 1 |
| Comparative Example 8 | 1 | 1 |
| Comparative Example 9 | 1 | 1 |
| Comparative Example 10 | 2 | 1 |
| Comparative Example 11 | 1 | 1 |
| Comparative Example 12 | 1 | 1 |

<Evaluation 2: Image Glossiness>

The procedures for forming and drying the solid image in Evaluation 1 were repeated except for using a single color cyan ink and single color magenta ink in an amount about 100% (0.7 μl/cm$^2$) to evaluate glossiness of the solid image. A gloss meter 4501 from BYL Gardener was used to measure glossiness of the solid image at 60°. The results are shown in Table 4.

TABLE 4

|  | 60° glossiness | |
| --- | --- | --- |
|  | Cyan | Magenta |
| Example 1 | 46 | 48 |
| Example 2 | 45 | 47 |
| Example 3 | 45 | 46 |

TABLE 4-continued

|  | 60° glossiness | |
| --- | --- | --- |
|  | Cyan | Magenta |
| Example 4 | 48 | 48 |
| Example 5 | 48 | 49 |
| Example 6 | 50 | 50 |
| Example 7 | 51 | 50 |
| Example 8 | 49 | 49 |
| Example 9 | 49 | 48 |
| Example 10 | 49 | 49 |
| Example 11 | 49 | 50 |
| Example 12 | 49 | 49 |
| Comparative Example 1 | 30 | 29 |
| Comparative Example 2 | 33 | 32 |
| Comparative Example 3 | 33 | 33 |
| Comparative Example 4 | 31 | 32 |
| Comparative Example 5 | 34 | 34 |
| Comparative Example 6 | 30 | 30 |
| Comparative Example 7 | 31 | 32 |
| Comparative Example 8 | 33 | 33 |
| Comparative Example 9 | 32 | 31 |
| Comparative Example 10 | 32 | 32 |
| Comparative Example 11 | 33 | 33 |
| Comparative Example 12 | 34 | 34 |

Tables 3 and 4 prove that an image having good granularity and glossiness was produced on a recording medium when the pre-treatment liquid of the present invention was applied and dried thereon.

Comparative Examples deteriorated in granularity and glossiness.

Having now fully described the invention, it will be apparent to one of ordinary skill in the art that many changes and modifications can be made thereto without departing from the spirit and scope of the invention as set forth therein.

What is claimed is:

1. A pre-treatment liquid, comprising:
    a flocculant formed of a water-soluble cationic polymer obtained by copolymerizing an amine monomer and an epihalohydrin monomer;
    a surface conditioner;
    a surfactant;
    a water-soluble organic solvent; and
    water,
    wherein the water-soluble cationic polymer is selected from the group consisting of:
    a copolymer having the following formula (1):

(1)

wherein each of R1 to R8 represents an alkyl group having 1 to 8 carbon atoms, a hydroxy alkyl group, an alkenyl group or a benzyl group, X represents a halogen atom, and n is an integer of 1 or 2;

a copolymer having a repeat unit having the following formula (2):

wherein X represents a halogen atom, m is an integer not less than 1, and both ends of the copolymer may be a monomer forming a repeat unit or an initiator;

a copolymer formed of an amine monomer and monomers having the following formulae (4) and (5):

wherein X represents a halogen atom, and the amine monomer is diethylenetriamine, triethylenetetramine, tetraethylenepentamine, iminobispropylamine; and a polymer having a dimethylamine-epichlorohydrin quaternary salt skeleton having the following formula:

wherein each of $R^1$ and $R^2$ represents an alkyl group having 1 to 8 carbon atoms, and n is an integer representing the number of repeat units.

2. The pre-treatment liquid of claim 1, wherein the surface conditioner is a compound having a polyether-modified polydimethylsiloxane structure.

3. The pre-treatment liquid of claim 1, wherein the pre-treatment liquid includes the surface conditioner in an amount of from 0.01 to 0.50% by weight.

4. The pre-treatment liquid of claim 1, wherein the surfactant is an acetylene glycol surfactant.

5. The pre-treatment liquid of claim 1, wherein the pre-treatment liquid includes the surfactant in an amount of from 0.10 to 0.50% by weight.

6. An image forming method, comprising:
applying the pre-treatment liquid according to claim 1 on a coating layer of a recording medium having the coating layer on at least one side of its substrate;
drying the pre-treatment liquid; and
discharging an aqueous ink on the dried recording medium by an inkjet recording method to form an image.

7. The image foaming method of claim 6, wherein the pre-treatment liquid is applied in an amount of from 0.1 to 20.0 g/m².

8. The image forming method of claim 6, wherein the aqueous ink comprises a pigment as a coloring material.

* * * * *